US010291758B2

(12) United States Patent
Xu

(10) Patent No.: US 10,291,758 B2
(45) Date of Patent: May 14, 2019

(54) INTELLIGENT VOICE REMINDER SYSTEM, SERVER AND THE METHOD THEREOF

(71) Applicant: HUIZHOU TCL MOBILE COMMUNICATION CO., LTD, Huizhou, Guangdong (CN)

(72) Inventor: Yuxin Xu, Huizhou (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 177 days.

(21) Appl. No.: 15/508,040

(22) PCT Filed: Aug. 5, 2016

(86) PCT No.: PCT/CN2016/093703

§ 371 (c)(1),
(2) Date: Mar. 1, 2017

(87) PCT Pub. No.: WO2017/113796

PCT Pub. Date: Jul. 6, 2017

(65) Prior Publication Data

US 2018/0234533 A1 Aug. 16, 2018

(30) Foreign Application Priority Data

Dec. 29, 2015 (CN) .......................... 2015 1 1029086

(51) Int. Cl.

*G10L 15/00* (2013.01)
*H04M 1/27* (2006.01)

(Continued)

(52) U.S. Cl.

CPC ............ *H04M 1/271* (2013.01); *G06F 3/167* (2013.01); *G10L 15/30* (2013.01); *H04L 29/08* (2013.01);

(Continued)

(58) Field of Classification Search

CPC ... G10L 15/22; G10L 2015/223; G10L 15/26; G10L 15/30; G10L 13/00; G10L 15/00; G10L 21/0364; G06Q 10/10

See application file for complete search history.

(56) References Cited

U.S. PATENT DOCUMENTS 6,640,230 B1 * 10/2003 Alexander ........... G06Q 10/107
8,660,849 B2 * 2/2014 Gruber .................... G10L 15/22 704/275
8,670,979 B2 * 3/2014 Gruber .................... G10L 15/22 704/9

(Continued)

FOREIGN PATENT DOCUMENTS

CN 102087854 A 6/2011
CN 102098555 A 6/2011

(Continued)

*Primary Examiner* — Edgar X Guerra-Erazo

(57) ABSTRACT

The present disclosure provides an intelligent voice reminder system, a server and a method thereof. The intelligent voice reminder system includes a terminal device, a player and a server. The server is connected with the player and the terminal device. The server includes a storage, a processor, a transceiver and a communication bus. The storage is configured to store data from the terminal device. The transceiver is configured to receive a voice input and output the voice input to the processor. The processor is configured to obtain a calendar reminder event or a phonebook from the storage based on the received voice input. The transceiver outputs the calendar reminder event or a phonebook to the player for playing.

10 Claims, 6 Drawing Sheets

(51) Int. Cl.

| | |
|---|---|
| ***H04L 29/08*** | (2006.01) |
| ***G06F 3/16*** | (2006.01) |
| ***G10L 15/30*** | (2013.01) |
| ***H04W 68/00*** | (2009.01) |
| ***H04M 1/725*** | (2006.01) |
| *G10L 15/22* | (2006.01) |

(52) U.S. Cl.
CPC ..... *H04M 1/72566* (2013.01); *H04W 68/005* (2013.01); *G10L 2015/221* (2013.01)

(56) References Cited

U.S. PATENT DOCUMENTS

| | | | | |
|---|---|---|---|---|
| 8,706,503 | B2 * | 4/2014 | Cheyer | G10L 15/22 704/275 |
| 8,731,942 | B2 * | 5/2014 | Cheyer | G10L 15/22 704/275 |
| 8,799,000 | B2 * | 8/2014 | Guzzoni | G10L 15/22 704/270.1 |
| 8,892,446 | B2 * | 11/2014 | Cheyer | G10L 15/22 704/275 |
| 8,903,716 | B2 * | 12/2014 | Chen | G10L 15/22 704/9 |
| 8,930,191 | B2 * | 1/2015 | Gruber | G10L 15/22 704/257 |
| 8,942,986 | B2 * | 1/2015 | Cheyer | G10L 15/22 704/275 |
| 9,117,447 | B2 * | 8/2015 | Gruber | G10L 15/22 |
| 9,318,108 | B2 * | 4/2016 | Gruber | G10L 15/22 |
| 9,548,050 | B2 * | 1/2017 | Gruber | G10L 15/22 |
| 9,858,925 | B2 * | 1/2018 | Gruber | G10L 15/18 |
| 10,057,736 | B2 * | 8/2018 | Gruber | H04W 4/16 |
| 2006/0217967 | A1 | 9/2006 | Goertzen et al. | |
| 2011/0148654 | A1 * | 6/2011 | Lau | G06Q 10/109 340/693.1 |
| 2013/0110518 | A1 * | 5/2013 | Gruber | G10L 15/22 704/275 |
| 2013/0275164 | A1 * | 10/2013 | Gruber | G10L 17/22 705/5 |
| 2014/0040748 | A1 * | 2/2014 | Lemay | G06F 3/167 715/728 |
| 2016/0078412 | A1 * | 3/2016 | Feliberti | G06Q 10/109 705/7.19 |

FOREIGN PATENT DOCUMENTS

| | | | |
|---|---|---|---|
| CN | 103929539 | A | 7/2014 |
| CN | 105025164 | A | 11/2015 |

* cited by examiner

INTELLIGENT VOICE REMINDER SYSTEM, SERVER AND THE METHOD THEREOF

TECHNICAL FIELD

This disclosure relates generally to the field of smart home systems, and more particularly, to an intelligent voice reminder system, a server and the method thereof.

BACKGROUND

Terminal devices, such as computers and mobile phones, have been quite popular with their powerful functions. These terminal devices store large amounts of data and files, such as calendar reminder events and phonebooks. However, after the terminal device is lost, damaged, or replaced, reconfiguring the information associated with the calendar reminder events and phonebooks can be a hassle and an annoyance for a user.

SUMMARY

A principal technical problem to be addressed by the disclosure is to provide an intelligent voice reminder system, a server and a method thereof, so as to avoid trouble for a user when a terminal device is lost, damaged, or replaced.

According to an aspect of the disclosure, an intelligent voice reminder system is disclosed that includes: a terminal device, a player configured to play audio data, and a server connected to the player, and connected to the terminal device via a network and the server comprises: a storage, a processor, a transceiver, and a communication bus; each of the storage, the processor and the transceiver is connected to the communication bus. The transceiver may be configured to receive the data from the terminal device. The storage may be configured to store the data from the terminal device. The transceiver may be further configured to receive a voice input and transmit the voice input to the processor. The processor may be configured to obtain a calendar reminder event or a phonebook from the storage based on the received voice input. The transceiver may be further configured to output the calendar reminder event or phonebook to the player; and the player may be is configured to play audio data associated with the calendar reminder event or the phonebook.

In some embodiments, the processor may be configured to generate a control signal and output the control signal to the transceiver, when the processor receives a calendar reminder event from the storage; the transceiver may be configured to detect whether the terminal device is connected to the sever via a network; and in response to the detection of the terminal device connected to the server via the network, the transceiver may be configured to output a detection signal to the processor; the processor may be configured to generate a reminder signal based on the detection signal; and the transceiver may be configured to transmit the reminder signal to the terminal device.

In some embodiments, the processor may be configured to determine whether an acknowledgment is received from the terminal device;

In some embodiments, the transceiver may be configured to stop outputting a reminder signal to the terminal device, when the acknowledgment is determined to be received from the terminal device.

In some embodiments, the transceiver may be configured to periodically output the reminder signal to the terminal device, when the acknowledgment is determined not to be received from the terminal device.

In some embodiments, the terminal device is a mobile phone and the player is a speaker.

According to another aspect of the disclosure, a server is disclosed that includes: the server may be connected to a player and connected to a terminal device via a network, comprising a storage, a processor, a transceiver, and a communication bus; each of the storage, the processor and the transceiver may be connected to the communication bus. The transceiver may be configured to receive data from the terminal device. The storage may be configured to store the data from the terminal device, the data comprising a calendar event and a phonebook. The transceiver is further configured to receive a voice input and transmit the voice input to the processor. The processor may be configured to obtain a calendar reminder event or a phonebook from the storage based on the received voice input. The transceiver may be configured to output the calendar reminder event or phonebook to the player; and the player may be configured to play audio data associated with the calendar reminder event or the phonebook.

In some embodiments, the processor may be configured to generate a control signal and output the control signal to the transceiver, when the processor receives a calendar reminder event from the storage; the transceiver may be configured to detect whether the terminal device is connected to the sever via a network; and in response to the detection of the terminal device connected to the server via the network, the transceiver may be configured to output a detection signal to the processor; the processor may be configured to generate a reminder signal based on the detection signal; and the transceiver may be configured to transmit the reminder signal to the terminal device.

In some embodiments, the processor may be configured to determine whether an acknowledgment is received from the terminal device;

In some embodiments, the transceiver may be configured to stop outputting a reminder signal to the terminal device, when the acknowledgment is determined to be received from the terminal device.

In some embodiments, the transceiver may be configured to periodically output the reminder signal to the terminal device, when the acknowledgment is determined not to be received from the terminal device.

In some embodiments, the terminal device is a mobile phone and the player is a speaker.

According to another aspect of the disclosure, an intelligent voice reminder method is disclosed that includes: receiving, from a server, data from the terminal device; storing, by the server, the data from the terminal device; the data comprising a calendar reminder event and a phonebook; receiving, by the server, a voice input; obtaining, by the server, the calendar reminder event or the phonebook based on the voice input; outputting, by the server, the calendar reminder event or the phonebook to the player for playing.

In some embodiments, the intelligent voice reminder method may further include: generating, by the server, a control signal, when the server receives the calendar reminder event from the storage; detecting, by the server, whether the terminal device is connected to the sever via a network; in response to the detection of the terminal device connected to the server via the network, generating, by the server, a detection signal; generating, by the server, a reminder signal based on the detection signal; and transmitting, by the server, the reminder signal to the terminal device to a remind the calendar reminder event for occurring.

In some embodiments, the intelligent voice reminder method may further include: in response to the detection of the terminal device not connected to the server via the network, refraining, by the server, from generating the reminder signal.

In some embodiments, the intelligent voice reminding method may further include: determining, by the server, whether an acknowledgment is received from the terminal device; stop outputting, by the server, a reminder signal to the terminal device, when the acknowledgment is determined to be received from the terminal device; and outputting periodically, by the server, the reminder signal to the terminal device, when the acknowledgment is determined not to be received from the terminal device.

In some embodiments, the terminal device is a mobile phone and the player is a speaker.

Advantages of the disclosure may follow. As compared with the prior art, the present disclosure provides for storing a calendar reminder event and a phonebook by a storage module, obtaining the calendar reminder event or the phonebook stored in the storage module through a voice input by a voice recognition module and playing audio data associated with the calendar reminder event or the phonebook. In addition, when a calendar reminder event is obtained and the terminal device is detected to be connected to the server via a network by a detection module, a reminder module may output the reminder signal to the terminal device to remind the calendar reminder event for occurring, so as to avoid trouble for a user when the terminal device is lost, damaged, or replaced.

DETAILED DESCRIPTION

Figure 1:
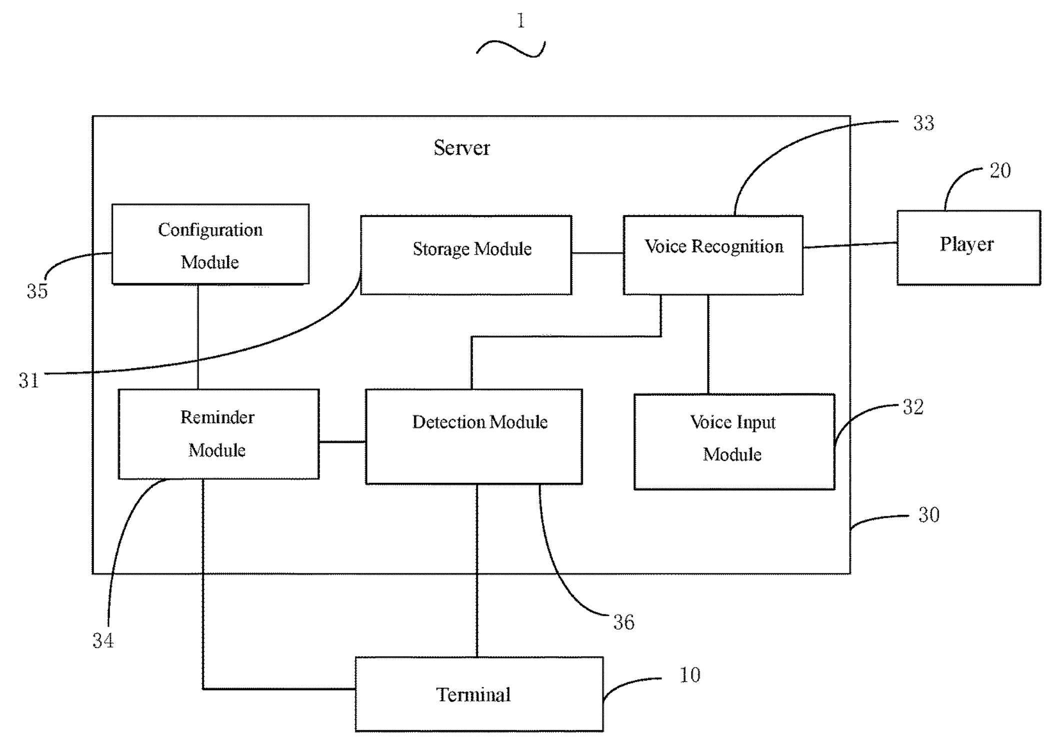
FIG. 1 is a block diagram of an intelligent voice reminder system according to an embodiment of the disclosure.

Turning to FIG. 1, a block diagram of an intelligent voice reminder system 1 according to an embodiment of the disclosure is depicted. As illustrated in FIG. 1, the intelligent voice reminder system (e.g., a smart home control system) 1 includes a terminal device 10, a player 20 configured to play audio data, and a server (e.g. a smart home server) 30. The server 30 is connected to the player 20. The server 30 is connected to the terminal device 10 via a network. The server 30 includes a storage module 31 connected the terminal device 10. The terminal device 10 may store data in the terminal device 10 to the storage module 31 via a network connection, and the data may include a calendar reminder event and a phonebook. The server 30 may include a voice input module 32 for receiving and outputting audio data. The server 30 may include a voice recognition module 33 configured to connect the voice input module 32 with the player 20. The voice recognition module 33 may be configured to receive audio data from the voice input module 32, and obtain the calendar reminder event or the phonebook from the storage module 31 based on the received audio data, and play audio data associated with the calendar reminder event or the phonebook via the player 20.

The server 30 may further include a reminder module 34 connected to the terminal device 10, a configuration module 35 connected to the reminder module 34. The configuration module 35 may be configured to configure a name of the server 30 and an activation of the reminder module 34. The server 30 includes a detection module 36 connected to the voice recognition module 33, the reminder module 34, and the terminal device 10. The voice recognition module 33 may be configured to output a control signal to the detection module 36, when the voice recognition module 33 obtains a calendar reminder event from the storage module 31; so that the detection module 36 may detect whether the terminal device 10 is connected to the server 30 via a network connection and may output a detection signal to the reminder module 34 when the terminal device 10 is connected to the server 30. The reminder module 34 may output a reminder signal to the terminal device 10 to remind the calendar reminder event for occurring, based on a received detection signal.

The terminal device 10 may include a mobile phone, the network may include a Wi-Fi network, and the player 20 may include a speaker. The terminal device 10 may upload data in the terminal device 10 to the storage module 31 via the Wi-Fi network and the terminal device 10 may download the data from the storage module 31 via the Wi-Fi network.

Figure 2:
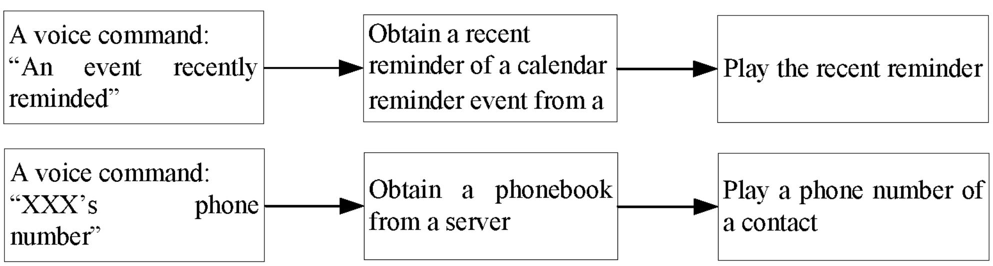
FIG. 2 is a schematic diagram of an intelligent voice reminder system of the disclosure.

Turning now to FIG. 2, when a calendar reminder event and a phonebook have been uploaded to the server 30, the calendar reminder event and the phonebook can be inquired by a voice command, such as “an event recently reminded” or “XXX’s phone number”. The server 30 may detect whether a mobile phone (e.g., the terminal device 10) of a user to be reminded is currently connected to a Wi-Fi home network (e.g., connected to the server 30) when playing a reminder. After outputting a reminder signal, the reminder module 34 may stop transmitting the reminder signal when an acknowledgement from the terminal 10 is received; otherwise, the reminder module 34 may transmit the reminder signal periodically, for example, in every 10 minutes.

It is understood that the storage module 31, the voice input module 32, the voice recognition module 33, the reminder module 34, the configuration module 35, and the detection module 36 maybe stored in a storage module. The storage module 31, the voice input module 32, the voice recognition module 33, the reminder module 34, the configuration module 35, and the detection module 36 maybe executed by a processor.

Figure 3:
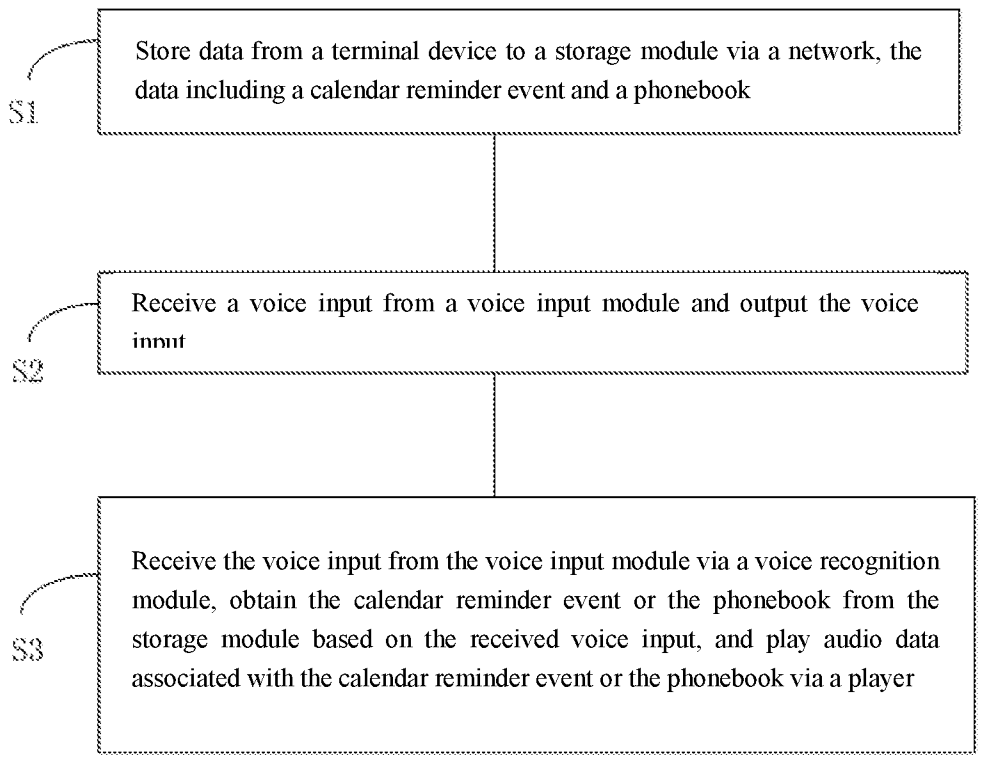
FIGS. 3 to 5 are the flow diagrams of an intelligent voice reminder method of the disclosure.

Turning now to FIG. 3, a flow diagram of an intelligent voice reminder method of the disclosure is depicted. As illustrated in FIG. 3, the intelligent voice reminder method may include the following blocks:

At block S1, data from the terminal device 10 is stored to the storage module 31 via a network, and the data include a calendar reminder event and a phonebook.

At block S2, a voice input is received through the voice input module 32 and the voice input is outputted.

At block S3, the voice input is received by the voice input module 32 via the voice recognition module 33, and a calendar reminder event or a phonebook is obtained based on the received voice input. Audio data associated with the calendar reminder event or the phonebook is played via the player 20.

Figure 4:
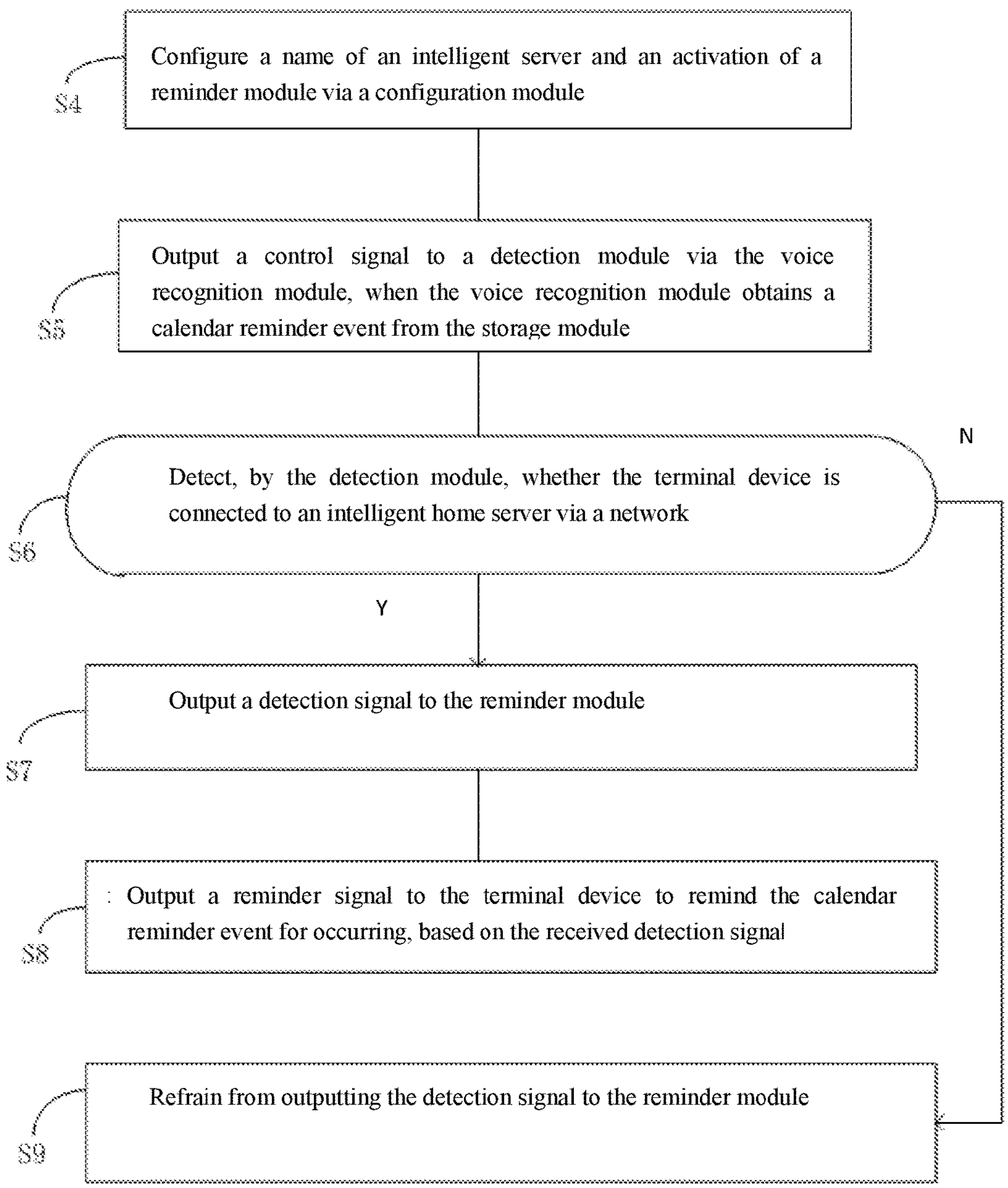

Turning now to FIG. 4, the intelligent voice reminder method may further include:

At block S4, a name of the server 30 and an activation of the reminder module 34 are configured by the configuration module 35.

At block S5, a control signal is outputted to the detection module 36 from the voice recognition module 33, when the voice recognition module 33 obtains a calendar reminder event from the storage module 31.

At block S6, whether the terminal device 10 is connected to the server 30 via a network is detected by the detection module 36.

At block S7, a detection signal is outputted to the reminder module 34, when the terminal device 10 is connected to the server 30.

At block S8, a reminder signal is outputted to the terminal device 10 to remind the calendar reminder event for occurring, based on the received detection signal.

At block S9, the detection signal is refrained from outputting to the reminder module 34, when the terminal device 10 is not connected to the server 30.

Figure 5:
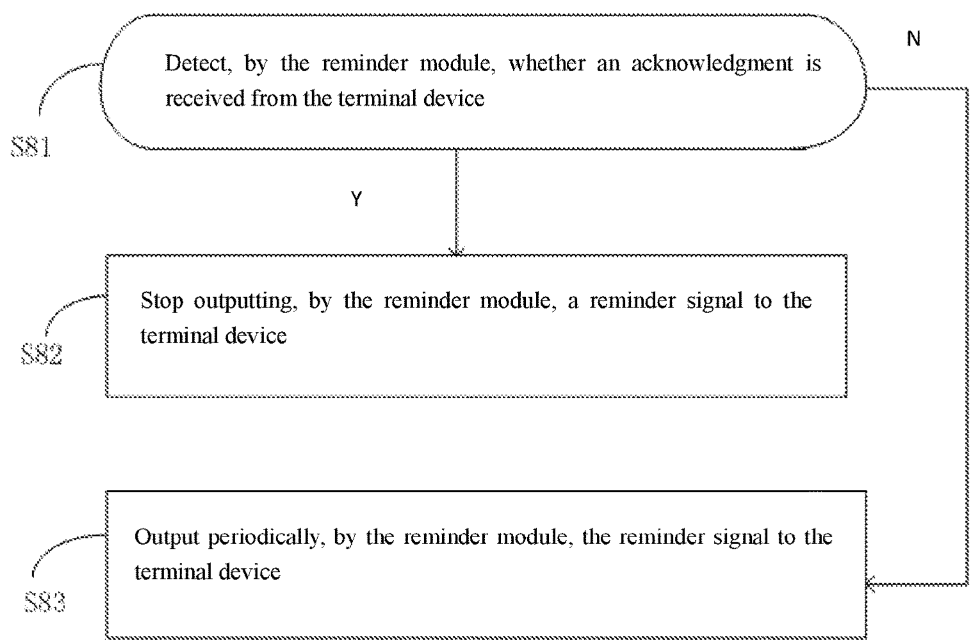

Turning now to FIG. 5, the following blocks may be performed after block S8 is performed:

At block S81, whether an acknowledgment is received from the terminal device 10 is detected by the reminder module 34.

At block S82, a reminder signal is stopped from outputting to the terminal device 10, when an acknowledgment is received from the terminal device 10 by the reminder module 34.

At block S83, the reminder signal is periodically outputted to the terminal device 10, when an acknowledgment is not received from the terminal device 10 by the reminder module 34.

Figure 6:
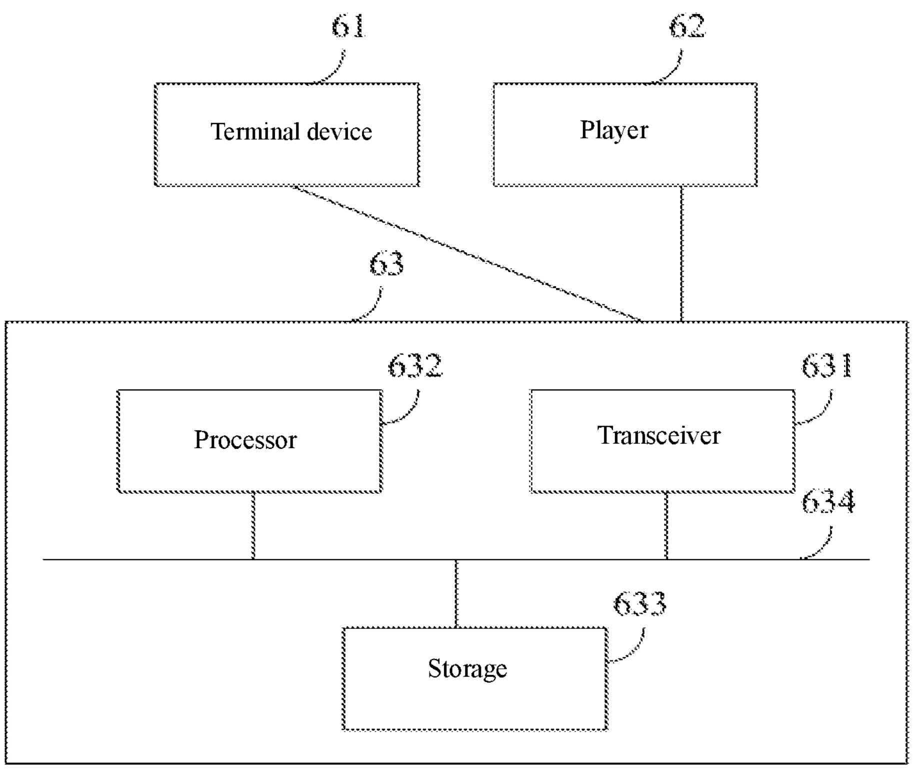
FIG. 6 is a block diagram of an intelligent voice reminder system according to another embodiment of the disclosure.

An intelligent voice reminder system is disclosed according to another embodiment of the disclosure. As shown in FIG. 6, the intelligent voice reminder system of the present disclosure includes a terminal device 61, a player 62, and a server 63. The server 63 is connected to the player 62. The server 63 is connected to the terminal device 61 via a network connection.

In some embodiments, the server 63 may include a transceiver 631, a processor 632, a storage 633, and a communication bus 634. Each of the transceiver 631, the processor 632, the storage 633 and may connect to the communication bus 634. The transceiver 631 connects to the player 62 and the terminal device 61.

The transceiver 631 may be configured to receive data of the terminal device 61; the storage 633 may store data of the terminal device 61, where the data may include a calendar reminder event and a phonebook; the transceiver 631 may also be configured to receive audio data and transmit the audio data to the processor 632; the processor 632 may be configured to obtain the calendar reminder event or the phonebook from a storage module based on the received audio data; the transceiver 631 may output audio data associated with the calendar reminder event or the phonebook to the player 62 for playing.

The processor 632 may generate a control signal and output the control signal to the transceiver 631 when the processor 632 obtains a calendar reminder event from the storage 633. The transceiver 631 may detect whether the terminal device 61 is connected to the server 63 via a network connection. When the terminal device 61 is detected to be connected to the server 63 via a network connection, the transceiver 631 may output a detection signal to the processor 632; the processor 632 may generate a reminder signal based on the detection signal; and the transceiver 631 may output the reminder signal to the terminal device 61.

The processor 632 may further determine whether the transceiver 633 receives an acknowledgment from the terminal device 61. If the transceiver 633 receives an acknowledgment from the terminal device 61, the transceiver 633 may stop outputting the reminder signal to the terminal device 61. If the transceiver 633 does not receive an acknowledgment from the terminal device 61, the transceiver 633 may periodically output the reminder signal to the terminal device 61.

The method and apparatus for a smart home control system of the disclosure may store a calendar reminder event and a phonebook through a storage module, obtain the calendar reminder event or the phonebook stored in the storage module through a voice recognition process by a voice recognition module, and play audio data associated with the calendar reminder event or the phonebook by a player. When the terminal device is determined to be connected to the server via a network connection by the detection module, the reminder module may output a reminder signal to the terminal device to remind the calendar reminder event for occurring, so as to avoid trouble for a user when the terminal device is lost, damaged, or replaced.

The above description merely depicts some exemplary embodiments of the disclosure, but is not limiting the scope of the disclosure. Any equivalent structure or flow transformations made to the disclosure, or any direct or indirect applications of the disclosure on any other related fields, shall all be covered within the protection of the disclosure.

What is claimed is:

1. An intelligent voice reminder system, comprising:

a terminal device configured to transmit data stored in the terminal device;

a player configured to play audio data; and a server connected to the player, and connected to the terminal device via a network, wherein the server comprises:

a storage, a processor, a transceiver, and a communication bus, wherein each of the storage, the processor and the transceiver is connected to the communication bus, wherein:

the transceiver is configured to receive the data from the terminal device;

the storage is configured to store the data from the terminal device;

the transceiver is further configured to receive a voice input and transmit the voice input to the processor;

the processor is configured to obtain the data from the storage based on the received voice input;

the transceiver is configured to output the data to the player; and the player is configured to play audio data associated with the data;

wherein the data comprises a calendar reminder event and a phonebook;

the processor is configured to generate a control signal and output the control signal to the transceiver, when the processor receives the calendar reminder event from the storage;

the transceiver is configured to detect whether the terminal device is connected to the sever via a network; and in response to the detection of the terminal device connected to the server via the network, the transceiver is configured to output a detection signal to the processor; the processor is configured to generate a reminder signal based on the detection signal; and the transceiver is configured to transmit the reminder signal to the terminal device;

the processor is further configured to determine whether an acknowledgment is received from the terminal device;

the transceiver is configured to stop outputting a reminder signal to the terminal device, when the acknowledgment is determined to be received from the terminal device; and the transceiver is further configured to periodically output the reminder signal to the terminal device, when the acknowledgment is determined not to be received from the terminal device.

2. The intelligent voice reminder system according to claim 1, wherein the terminal device is a mobile phone and the player is a speaker.

3. A server connected to a player and connected to a terminal device via a network, comprising a storage, a processor, a transceiver, and a communication bus, wherein, each of the storage, the processor and the transceiver is connected to the communication bus; wherein:

the transceiver is configured to receive data from the terminal device;

the storage is configured to store the data from the terminal device, the data comprising a calendar event and a phonebook;

the transceiver is further configured to receive a voice input and transmit the voice input to the processor;

the processor is configured to obtain a calendar reminder event or a phonebook from the storage based on the received voice input; and the transceiver is configured to output the calendar reminder event or phonebook to the player for playing;

the processor is configured to generate a control signal and output the control signal to the transceiver, when the processor receives a calendar reminder event from the storage;

the transceiver is configured to detect whether the terminal device is connected to the sever via a network; and in response to the detection of the terminal device connected to the server via the network, the transceiver is configured to output a detection signal to the processor; the processor is configured to generate a reminder signal based on the detection signal; and the transceiver is configured to transmit the reminder signal to the terminal device;

the processor is configured to determine whether an acknowledgment is received from the terminal device;

the transceiver is configured to stop outputting a reminder signal to the terminal device, when the acknowledgment is determined to be received from the terminal device; and the transceiver is configured to periodically output the reminder signal to the terminal device, when the acknowledgment is determined not to be received from the terminal device.

4. The server according to claim 3, wherein the terminal device is a mobile phone and the player is a speaker.

5. An intelligent voice reminder method comprising:

receiving, by a server, data from a terminal device;

storing, by the server, the data from the terminal device, the data comprising a calendar reminder event and a phonebook;

receiving, by the server, a voice input;

obtaining, by the server, the calendar reminder event or the phonebook from the storage based on the received voice input;

outputting, by the server, the calendar reminder event or the phonebook to the player for playing;

generating, by the server, a control signal, when the server receives the calendar reminder event from the data;

detecting, by the server, whether the terminal device is connected to the sever via a network based on the control signal; and in response to the detection of the terminal device connected to the server via the network, generating, by the server, a detection signal; generating, by the server, a reminder signal based on the detection signal; and transmitting, by the server, the reminder signal to the terminal device to remind the calendar reminder event for occurring;

in response to the detection of the terminal device not connected to the server via the network, refraining, by the server, from generating the reminder signal;

wherein after the block of transmitting, by the server, the reminder signal to the terminal device, the method further comprises:

determining, by the server, whether an acknowledgment is received from the terminal device;

stop outputting, by the server, a reminder signal to the terminal device, when the acknowledgment is determined to be received from the terminal device; and outputting periodically, by the server, the reminder signal to the terminal device, when the acknowledgment is determined not to be received from the terminal device.

6. The intelligent voice reminder method according to claim 5, wherein the terminal device is a mobile phone and the player is a speaker.

7. The intelligent voice reminder system according to claim 1, wherein the storage comprises a storage module configured to storage the data in the terminal device, a voice input module configured to receive and output audio data, a voice recognition module configured to connect the vice input module with the player, a reminder module connected to the terminal device, a configuration module configured to configure a name of the server and an activation of the reminder module, and a detection module connected to the voice recognition module, the reminder module and the terminal module.

8. The intelligent voice reminder system according to claim 7, wherein the voice recognition module is configured to receive audio data from the voice input module, and obtain the calendar reminder event or the phonebook from the storage module based on the received audio data, and play audio data associated with the calendar reminder event or the phonebook via the player.

9. The intelligent voice reminder system according to claim 8, Wherein the voice recognition module is configured to output a control signal to the detection module, when the voice recognition module obtains the calendar reminder event from the storage module; so that the detection module detects whether the terminal device is connected to the server via a network connection and may output a detection signal to the reminder module when the terminal device is connected to the server.

10. The intelligent voice reminder system according to claim 9, wherein the reminder module is configured to output a reminder signal to the terminal device to remind the calendar reminder event for occurring, based on a received detection signal.

* * * * *